H. C. SPARROW.
CRUTCH.
APPLICATION FILED JULY 19, 1917.

1,266,074.

Patented May 14, 1918.

WITNESSES.

Henry Charles Sparrow INVENTOR.

UNITED STATES PATENT OFFICE.

HENRY CHARLES SPARROW, OF CLAPHAM JUNCTION, LONDON, ENGLAND.

CRUTCH.

1,266,074.  Specification of Letters Patent.  Patented May 14, 1918.

Application filed July 19, 1917. Serial No. 181,544.

*To all whom it may concern:*

Be it known that HENRY CHARLES SPARROW, a subject of the King of Great Britain and Ireland, residing at 123 Mallinson road, Clapham Junction, London, S. W., England, has invented certain new and useful Improvements in and Relating to Crutches, of which the following is a specification.

The said invention relates to crutches of the type wherein the arm rest is oscillatable on the leg of the crutch and forms a resilient support for the arm pit and the object of this invention is to make walking with the aid of such crutches more easy.

According to the said invention the arm rest of the crutch is provided with an extension which is free to oscillate and slide, and the crutch is provided with a rotatable resilient member on which the said extension rides, so that the arm rest and the said member can roll on each other and the said arm rest when bearing the weight of the user is resiliently supported by the said member.

In the accompanying sheet of drawings:—

Figure 1:
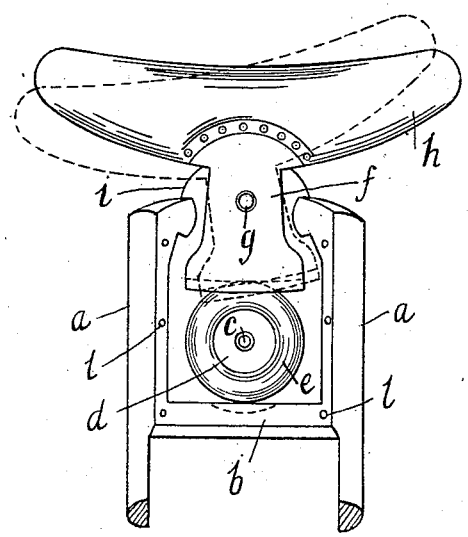
Figure 1 is a side elevation of the upper part of a crutch constructed in accordance with the said invention, one of the side plates having been removed.
Figure 2:
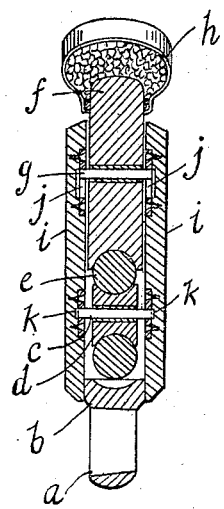
Fig. 2 is a vertical section through the crutch shown in Fig. 1.
Figure 3:
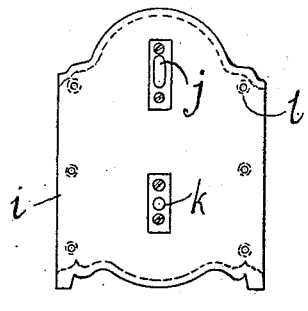
Fig. 3 is a view showing the inner side of one of the side plates.

Referring to Figs. 1 to 3, *a, a* are the bifurcations of a crutch and have secured between them at their upper ends, a frame *b* the top of which is broken to form a gap. To the sides of the frame are secured two side plates *i, i* by screws engaging holes *l* or by other suitable fastening means. Each side plate *i* is provided with a vertical slot *j* in which a spindle *g* is free to slide. The arm rest *h* of the crutch is provided with an extension *f* extending through the gap in the frame *b* and turnably mounted on the spindle *g*. The side plates *i, i* have each a hole *k* situated below the slots *j* and carrying a spindle *c*. A roller *d* provided with a solid rubber tire *e* is rotatably mounted on the spindle *c*. The end of the extension *f* is grooved to fit on the tire *e*, see Fig. 2.

When the crutch is in use the weight of the user causes the arm rest to press on the cushion formed by the tire *e* and thereby imparts to the arm rest the property of resiliency which assists the forward movement of the user.

When the crutch leg is moved forward in relation to the user the pressure on the tire *e* is released and the extension *f* and the tire *e* perform a rolling action in relation to each other and the arm rest remains practically stationary against the arm pit of the wearer. At the end of the movement of the crutch leg in one direction the arm rest *h* assumes the position shown in dotted lines in Fig. 1. The forward movement of the user also produces a rolling action between the extension *f* and the tire *e* and a relative displacement of the arm rest in the opposite direction, the relative movement between the crutch and the arm rest being limited in both directions by the abutment of the extension *f* against the sides of the frame *b*.

Figure 4:
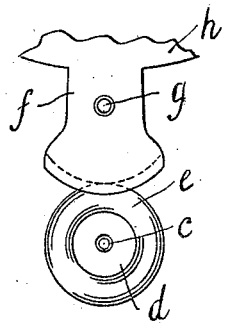
Fig. 4 is a detached view showing a modified detail.

In lieu of forming the end of the extension approximately straight as shown in Fig. 1, the said end may be formed semicircular as shown in Fig. 4, when the rolling action of the parts *f* and *e* becomes more accentuated, but I prefer to employ a shape of extension similar to that shown in Fig. 1, because the ends of the approximately straight portion of the extension *f* compress the tire *e* when they are brought in contact therewith and the tire *e* thereby exerts a braking action on the relative movement of the crutch leg and the arm rest *h* as the extremity of such movement is approached, and furthermore the arm rest is brought by the resiliency of the tire into its horizontal position when free of the weight of the user.

As will be readily understood the above described construction may be varied within the limits of the invention. For example, the relative movement may be limited by stops arranged on the top of the frame *b* or beneath the arm rest *h* and the tire *e* may be of the pneumatic type or spring cored type. Furthermore ball bearings may be provided for the spindles *c* and *g*.

What I claim is:

1. A crutch comprising an arm rest provided with a downward extension mounted on a pin working in a slot fixed in crutch frame free to oscillate and slide, a rotatable resilient member on which said extension rides permitting said arm rest and said rotatable member to roll on each other, said arm rest when bearing the weight of a user being resiliently supported by said member.

2. A crutch comprising an arm rest provided with a downward extension mounted about a pin and slot to be free to oscillate and slide in a housing formed in the upper portion of crutch, a rotatable resilient member on which said extension rides permitting said arm rest and said rotatable member to roll on each other as and for the purpose specified.

3. A crutch comprising an arm rest provided with a downward extension mounted on a pin working in a slot to be free to oscillate and slide in upper portion of crutch, a rotatable resilient member on which said extension rides permitting said arm rest and said rotatable member to roll on each other, said extension being so rounded and shaped as to compress said rotatable member when the crutch leg and arm rest are nearing the extreme positions, exerting a braking action, as and for the purpose specified.

4. In a crutch, the combination of a frame secured between the upper ends of bifurcations and forming a housing into which extends an extension formed on an arm rest, said arm rest and its extension turnably mounted on a spindle which is free to slide in vertical slots formed in side plates, said plates secured to the sides of crutch frame, and a roller having a spring or rubber tire and rotatably mounted in said frame which engages the periphery of the arm rest extension substantially as and for the purpose specified.

HENRY CHARLES SPARROW.

Copies of this patent may be obtained for five cents each, by addressing the "Commissioner of Patents, Washington, D. C."